(12) United States Patent
Miyashita et al.

(10) Patent No.: US 10,024,517 B2
(45) Date of Patent: Jul. 17, 2018

(54) LENS MEMBER AND LIGHT-EMITTING DEVICE USING SAME

(75) Inventors: Junji Miyashita, Yamanashi-ken (JP); Yasuaki Kayanuma, Yamanashi-ken (JP); Kenji Matsumoto, Tokyo (JP)

(73) Assignees: CITIZEN ELECTRONICS CO., LTD., Yamanashi-Ken (JP); CITIZEN WATCH CO., LTD., Tokyo (JP)

( * ) Notice: Subject to any disclaimer, the term of this patent is extended or adjusted under 35 U.S.C. 154(b) by 325 days.

(21) Appl. No.: 14/237,983

(22) PCT Filed: Aug. 13, 2012

(86) PCT No.: PCT/JP2012/070601
§ 371 (c)(1),
(2), (4) Date: Mar. 25, 2014

(87) PCT Pub. No.: WO2013/024836
PCT Pub. Date: Feb. 21, 2013

(65) Prior Publication Data
US 2014/0204592 A1    Jul. 24, 2014

(30) Foreign Application Priority Data
Aug. 12, 2011    (JP) .................................. 2011-177088

(51) Int. Cl.
*F21V 5/00* (2018.01)
*F21V 5/04* (2006.01)
(Continued)

(52) U.S. Cl.
CPC ............ *F21V 5/045* (2013.01); *F21S 41/141* (2018.01); *F21S 41/143* (2018.01);
(Continued)

(58) Field of Classification Search
CPC ........ F21S 8/1283; F21S 8/2212; F21S 8/236; F21V 5/045; G02B 3/08; G02B 5/1866; G02B 19/0061; G02B 19/0028
See application file for complete search history.

(56) References Cited

U.S. PATENT DOCUMENTS 4,859,043 A * 8/1989 Carel .................. F21S 48/2212
359/710
4,880,292 A    11/1989 Kageyama et al.
(Continued)

FOREIGN PATENT DOCUMENTS

CN        1170878 A     1/1998
CN      101257637 A     9/2008
(Continued)

OTHER PUBLICATIONS

Extended European Search Report dated Apr. 8, 2014 in corresponding European Patent Application No. 12824164.3.
(Continued)

*Primary Examiner* — Julie Bannan
(74) *Attorney, Agent, or Firm* — Wenderoth, Lind & Ponack, L.L.P.

(57) ABSTRACT

A lens member includes a light-incident side; a light-exit side that is opposite to the light-incident side, a Fresnel lens arranged on a center axis that passes through a center of the light-incident side, and a diffraction grating structure arranged around a periphery of the Fresnel lens and having a center through which the center axis passes. Also, it is disclosed that the Fresnel lens may include a first Fresnel lens and a second Fresnel lens, the first Fresnel lens includes annular prisms that are divided from a convex lens and having a center through which the center axis of the light-incident side passes, and the second Fresnel lens includes annular prisms that are divided from a TIR lens and arranged (Continued)

around the periphery of the first Fresnel lens, centering around the center axis of the light-incident side.

20 Claims, 17 Drawing Sheets

(51) Int. Cl.
| | |
|---|---|
| *F21V 7/00* | (2006.01) |
| *G02B 3/08* | (2006.01) |
| *G02B 5/18* | (2006.01) |
| *G02B 19/00* | (2006.01) |
| *F21S 41/141* | (2018.01) |
| *F21S 41/143* | (2018.01) |
| *F21S 41/275* | (2018.01) |
| *F21S 43/14* | (2018.01) |
| *F21S 43/20* | (2018.01) |
| *F21S 43/31* | (2018.01) |
| *F24J 2/08* | (2006.01) |
| *F21K 9/20* | (2016.01) |
| *F21Y 115/10* | (2016.01) |
| *F21K 9/69* | (2016.01) |

(52) U.S. Cl.
CPC ............ *F21S 41/275* (2018.01); *F21S 43/14* (2018.01); *F21S 43/26* (2018.01); *F21S 43/315* (2018.01); *F21V 5/002* (2013.01); *F21V 5/04* (2013.01); *F21V 7/0091* (2013.01); *G02B 3/08* (2013.01); *G02B 5/188* (2013.01); *G02B 5/1866* (2013.01); *G02B 19/0028* (2013.01); *G02B 19/0061* (2013.01); *F21K 9/20* (2016.08); *F21K 9/69* (2016.08); *F21Y 2115/10* (2016.08); *F24J 2/085* (2013.01)

(56) References Cited

U.S. PATENT DOCUMENTS

| | | | | |
|---|---|---|---|---|
| 5,128,848 | A | * | 7/1992 | Enders ...................... F21V 3/02 |
| | | | | 362/268 |
| 2003/0075167 | A1 | | 4/2003 | Minano Dominguez et al. |
| 2005/0024746 | A1 | * | 2/2005 | Shimura ................. F21V 5/045 |
| | | | | 359/742 |
| 2006/0044806 | A1 | | 3/2006 | Abramov et al. |
| 2006/0132920 | A1 | | 6/2006 | Kleemann |
| 2007/0147041 | A1 | * | 6/2007 | Shiratsuchi ............. F21V 5/007 |
| | | | | 362/268 |
| 2008/0092879 | A1 | | 4/2008 | Minano Dominguez et al. |
| 2009/0103060 | A1 | | 4/2009 | Hirata et al. |
| 2010/0284194 | A1 | | 11/2010 | Miyashita et al. |
| 2011/0128472 | A1 | | 6/2011 | Hirata et al. |

FOREIGN PATENT DOCUMENTS

| | | |
|---|---|---|
| EP | 1 251 366 | 10/2002 |
| JP | 57-55002 | 4/1982 |
| JP | 59-119340 | 7/1984 |
| JP | 64-37541 | 2/1989 |
| JP | 01-282501 | 11/1989 |
| JP | 1-282501 | 11/1989 |
| JP | 05-281402 | 10/1993 |
| JP | 2002-352611 | 12/2002 |
| JP | 2005-292666 | 10/2005 |
| JP | 2007-011216 | 1/2007 |
| JP | 2008-209811 | 9/2008 |
| JP | 2010-262187 | 11/2010 |
| JP | 2011-141450 | 7/2011 |
| WO | 2004/102232 | 11/2004 |

OTHER PUBLICATIONS

International Search Report dated Nov. 20, 2012 in International (PCT) Application No. PCT/JP2012/070601.
Chinese Office Action dated Feb. 27, 2015 in corresponding Chinese Patent Application No. 201280039298.6 with English translation.
Chinese Office Action dated Jun. 26, 2015 in corresponding Chinese Patent Application No. 201280039298.6 with English translation.
Chinese Office Action dated Sep. 19, 2014 in corresponding Chinese Patent Application No. 201280039298.6 with English translation.
Office Action dated Nov. 24, 2015 in corresponding Chinese Patent Application No. 201280039298.6 with English translation.

* cited by examiner

LENS MEMBER AND LIGHT-EMITTING DEVICE USING SAME

TECHNICAL FIELD

The present invention relates to a lens member and a light-emitting device including the lens member and a light source that is arranged to face the lens member.

BACKGROUND ART

In recent years, more and more light-emitting devices, such as illuminations, projectors, flashes, and headlights and tail lamps of automobiles, are using light emitting diodes (LEDs) as a light source. In such light-emitting devices, especially in devices using a narrow directional LED as a light source, a lens that collects or collimates the light emitted from the light-emission surface of the LED is used. A convex refractive lens is generally used as such a lens. Since the convex refractive lens is thick at the convex portion, it has been also proposed to adopt a Fresnel lens in order to make the lens thinner.

A lens for lighting fixtures has conventionally been proposed (see Patent Literature 1). The lens has a grating-shape refracting prism portion provided in a central part of an inner surface in the vicinity of an optical axis (i.e., a center axis of the lens), the inner surface being a light-incident surface facing a light source. The lens also has a grating-shape reflecting prism portion in a peripheral part of the grating-shape refracting prism portion. A lens member has also been proposed which is formed so that a Fresnel lens surface provided on a light-incident surface has a plurality of prisms (see Patent Literature 2). Part of incident light beams is totally reflected by a non-lens surface provided on some of the plurality of prisms and is then emitted to a light-emission surface on the opposite side of the light-incident surface. Further, an optical device has been proposed which has a refractive lens portion and a reflector portion provided on a central part centering around a center axis of a lens member (see Patent Literature 3). The reflector portion allows light beams to be incident on an inner surface portion while the light reflection surface having a paraboloidal shape totally reflects the light beams and converts the light beam into parallel beams of light.

However, in each of the above-described Fresnel lenses, when top ends of the prisms have an acute angle formed from a prism incident surface and a prism reflection surface, metal molds for the prisms that are to be filled with a resin are formed to have narrow top ends, and accordingly, a resin may not fully enter therein. In that case, the top ends of the prisms are rounded, which prevents high-accuracy light incidence and reflection at the top ends of the prisms. This causes problems of degradation in performance such as front illuminance of the light-emission surface of the Fresnel lens and the like. In the lens member described in Patent Literature 3, the light reflection surfaces of the prisms are needed to be set higher in order to totally reflect all the light beams that are incident on the light-incident surface close to the rounded top end portions of the prisms. As a result, the lens thickness is disadvantageously increased.

Further, in each of the lenses described in the above Patent Literatures 1 through 3, a loss occurs as part of light which is incident on the light-incident surfaces of the prisms fails to reach the light reflection surfaces of the prisms. This disadvantageously makes it difficult to maximize utilization efficiency of the light emitted from the light source. For example, in Patent Literature 3, between the convex refractive lens portion centered around the center axis and the reflector portion positioned outside the refractive lens portion, there is an area where incident light does not reach the light reflection surface of the reflector portion. The light which transmits this area is lost.

Moreover, radiation light from an LED used as a light source has a luminous intensity distribution in which light intensity is smaller as a light radiation angle is larger. As illustrated in FIG. 6, when the light-emission surface of an LED used as a light source 2 is disposed so as to face the light-incident surface of a conventional total internal reflection (TIR) lens 1, the light incident on the light-incident surface, which is an inner concave lens surface 3 of the TIR lens 1 disposed so as to face the light-emission surface of the LED 2, is totally reflected by a light reflection surface of an outer convex lens surface 4. When the light with relatively high light intensity is incident as incident light L2 from the periphery of a central part of the LED 2 onto the light-incident surface of the TIR lens 1 at a position close to a center axis AX, the incident light L2 is reflected by a portion of the light reflection surface which is on the upper peripheral side of the convex lens surface 4. As a result, the TIR lens 1 has a high luminous intensity in the vicinity of the center axis AX but has a low luminous intensity in the vicinity of an intermediate area outside the vicinity of the center axis and also has a high luminous intensity outside the vicinity of the intermediate area. Accordingly, if the TIR lens 1 is formed into a Fresnel lens by a conventional technology without modification, the emitted light forms ring-shaped unnecessary light (lens flare) around the optical axis as seen in the case of the TIR lens 1, which still causes a problem of deteriorated appearance. Further, in the lens described in Patent Literature 3, both the light-incident surface and the light-emission surface of the reflecting lens portion are aspherical, which causes difficulty in processing to form the lens into a Fresnel lens and increases processing costs.

As a solution to these problems, a lens member has been proposed in which a light-incident surface of a lens disposed so as to face a light source is divided into a plurality of concentric segmented areas centered around the optical axis of the light source. The light-incident surface has a Fresnel lens including a plurality of prism portions which are different in refraction angle corresponding to the segmented areas. The TIR lens is configured to have a concave lens surface which is provided on the lower side of the TIR lens with the center axis as a center, the concave lens surface being disposed so as to face the light-emission surface of the light source. The TIR lens is configured to also have a convex lens surface provided on a peripheral side surface of the TIR lens. Light incident on the lower concave lens surface is totally reflected by the convex lens surface, so that the light travels toward the light-emission surface of the TIR lens. The light-emission surface of the TIR lens is positioned on the upper side of the TIR lens, and is in parallel with the light-emission surface of the light source and also positioned above the light-emission surface of the light source. This TIR lens is formed into a Fresnel lens by dividing the lens into a plurality of prisms. Each of the prisms is composed of a prism incident surface corresponding to a segmented area of the concave lens surface, and a prism reflection surface corresponding to a segmented area of the convex lens surface which totally reflects the light incident on the segmented area. When the prisms divided from the TIR lens are disposed as a Fresnel lens, a prism corresponding to a more upper outside segmented area of the convex lens surface in the TIR lens is disposed at a more inside position of the Fresnel lens (position closer to the center axis). A prism corresponding to a more lower outside segmented area of the convex lens surface in the TIR lens is disposed at a more outside position of the Fresnel lens (a more outer peripheral region of the Fresnel lens). A lens member having such configuration has been proposed (see Patent Literatures 4 and 5).

In this lens member, the above-described division arrangement is adopted when the lens surface of the TIR lens is divided into a plurality of prisms to use the TIR lens as a Fresnel lens. Accordingly, the light at the periphery of the central part with relatively high light intensity is incident on the light-incident surface of the prisms positioned close to the center axis, and is totally reflected by the light reflection surface of the prisms. Therefore, intense light which used to be emitted from the outer side of the conventional TIR lens can be emitted from the vicinity of an intermediate area on the inner side. This makes it possible to obtain a brightness distribution of the light source which looks natural for human eyes as its luminous intensity gradually decreases from a bright center toward a dark outer side. As a result, generation of ring-shaped lens flare which looks unnatural can be suppressed, and its appearance can be improved thereby. Moreover, since the light-incident surface and the light reflection surface which correspond to each other constitute one prism via a ridgeline and the plurality of prisms are disposed in sequence, the light incident on the light-incident surface in each of the prisms is all totally reflected at the moment when the light reaches the adjacent light reflection surface. According to the above configuration, using this lens member as a light source makes it possible to obtain illuminating devices with considerably enhanced light utilization efficiency.

CITATION LIST

Patent Literature

Patent Literature 1: Japanese Patent Application Publication No. S57-55002
Patent Literature 2: Japanese Patent Application Publication No. S59-119340
Patent Literature 3: Japanese Patent Application Publication No. H05-281402
Patent Literature 4: Japanese Patent Application Publication No. 2010-262187
Patent Literature 5: Japanese Patent Application Publication No. 2011-141450

SUMMARY OF INVENTION

Technical Problem

However, the above-stated conventional technologies still have the following problems. That is, while each of the lens members described in Patent Literatures 4 and 5 can be thinned to some extent, an outer peripheral side of the lens member may be thickened depending on the shape of the TIR lens before being formed into a Fresnel lens. As a consequence, the entire lens member is also disadvantageously thickened in proportion to the thickened outer peripheral side. Accordingly, a thinner lens member maintaining light-collecting performance is being demanded. Particularly, when the lens member is thick, time for molding resin also becomes longer in proportion to the thickness. Therefore, in view of costs and mass productivity, reduction in thickness is required. There is also a demand for a plate-shaped lens member with a plurality of LED elements arranged in a plane to have a large light emission area and to maintain reliability of product even when the lens is used together with a light source achieving a large amount of luminous fluxes.

The present invention has been made to solve the aforementioned problems, and an object of the present invention is to provide a lens member which enables further reduction in thickness while having high light-collecting performance, and a light-emitting device using the lens member.

Solution to Problem

In order to solve the above-mentioned problems, the present invention has adopted the following configuration. That is, a lens member according to an embodiment of the present invention includes: a light-incident side; a light-exit side that is opposite to the light-incident surface; a Fresnel lens arranged on a center axis that passes through a center of the light-incident side; and a diffraction grating structure arranged around a periphery of the Fresnel lens and arranged to be centered around the center axis.

In the lens member according to the present invention, the Fresnel lens includes: a first Fresnel lens and a second Fresnel lens, the first Fresnel lens including annular prisms that are divided from a convex lens and having a center through which the center axis of the light-incident side passes, and the second Fresnel lens includes annular prisms that are divided from a TIR lens and arranged around the periphery of the first Fresnel lens and arranged to be centered around the center axis of the light-incident side.

In the lens member according to the present invention, the diffraction grating structure includes annular minute grooves each arranged with a constant pitch width, and each of the annular minute grooves has a generally triangular shape in cross-section.

In the lens member according to an embodiment of the present invention, each of the annular minute grooves included in the diffraction grating structure includes an outer slope and an inner slope that is positioned closer to the center axis of the light-incident side than the outer slope, and an inclination angle of the outer slope and an inclination angle of the inner slope in each of the annular minute grooves change on the basis of distance from the center axis.

In the lens member according to the present invention, the annular prisms included in the Fresnel lens are different from the diffraction grating structure in the range of an incident angle of light to be received.

Moreover, a light-emitting device according to the present invention includes: the lens member according to the present invention; and a light source disposed to face a light-incident side of the lens member and having a light-emission surface and having a center through which a center axis of the lens member passes, wherein an outer peripheral edge of the light-emission surface of the light source is positioned inside an inner diameter of the diffraction grating structure arranged centering around the center axis of the lens member.

Advantageous Effects of Invention

According to the present invention, the following effects are achieved.

The lens member and the light-emitting device according to the present invention has a diffraction grating structure that is annularly arranged around a periphery of a Fresnel lens to diffract light from a light source and to emit the light as diffracted light from a light-exit side that is positioned at an opposite side of a light-incident side. Accordingly, the entire lens member can be further thinned while its light-collecting performance can be maintained. This makes it possible to provide illuminations which can be manufactured at low cost and which are excellent in mass productivity and high in light-collecting performance.

DESCRIPTION OF EMBODIMENTS

Hereinafter, embodiments of a lens member and a light-emitting device using the lens member according to the present invention will be described with reference to the accompanying drawings. Note that, in some of the drawings for use in the following description, a drawing scale is properly changed so that respective members and forms are sized to be recognizable.

Figure 1:
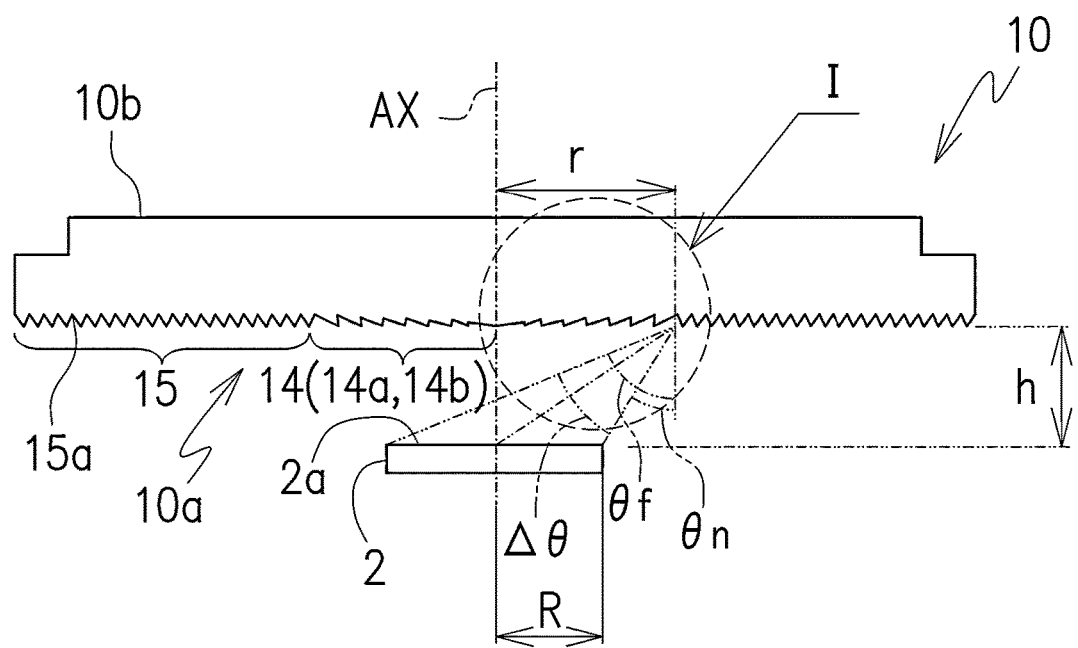
FIG. 1 is a cross sectional view of a lens member according to a first embodiment of the present invention.
Figure 2:
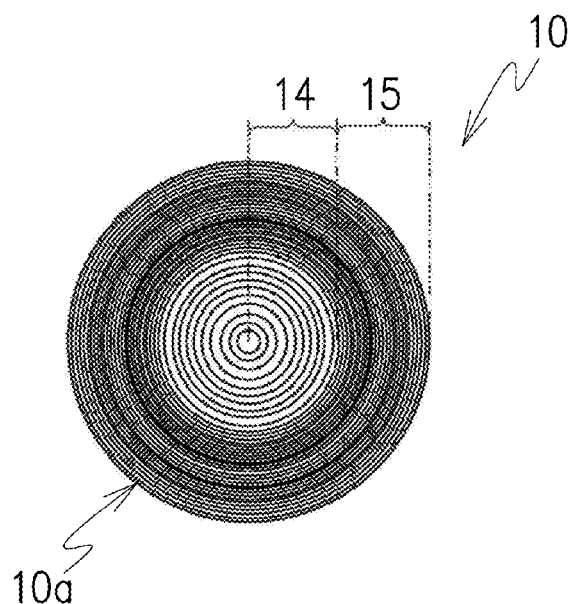
FIG. 2 is a plan view illustrating the lens member from a light-incident side thereof.
Figure 3:
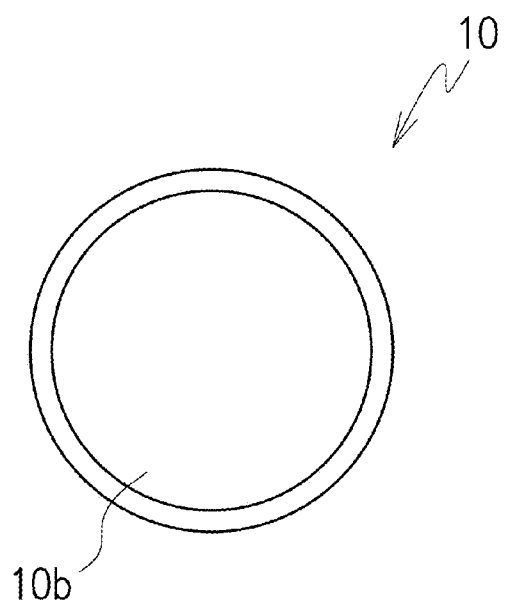
FIG. 3 is a plan view illustrating a light exit side of the lens member.

As illustrated in FIG. 1, a lens member 10 in the present embodiment has a light-incident side 10a, a light-exit side 10b that is opposite to the light-incident side 10a, a Fresnel lens 14 arranged on a center axis AX that passes through a center of the light-incident side 10a, and a diffraction grating structure 15 arranged around a periphery of the Fresnel lens 14 and arranged to be centered around the center axis AX. In the embodiment illustrated in FIGS. 1 through 4, the lens member 10 is illustrated as a circular-plate-shaped lens. Note that the center axis AX is an imaginary line indicating the center of the lens member 10. When the lens member 10 is disposed together with a light source 2, the center axis AX is disposed in alignment with an optical axis of the light source 2. The light-incident side 10a of the lens member 10 is arranged to face a light-emission surface 2a of the light source 2. The Fresnel lens 14 provided on the light-incident side 10a of the lens member 10 has a plurality of concentric annular prisms around the center axis AX.

Figure 5:
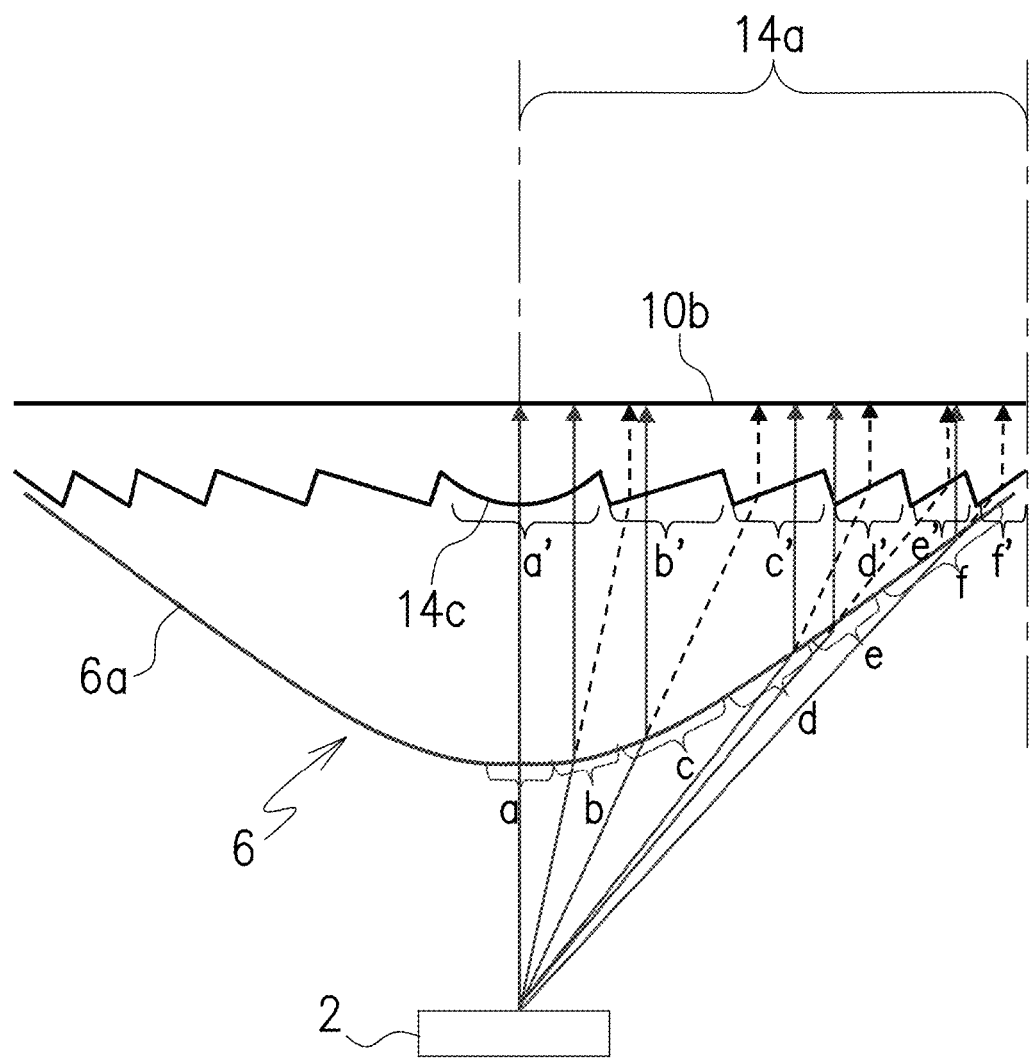
FIG. 5 is an explanatory view illustrating a Fresnel lens into which a convex lens is to be arranged and used as a first Fresnel lens.
Figure 6:
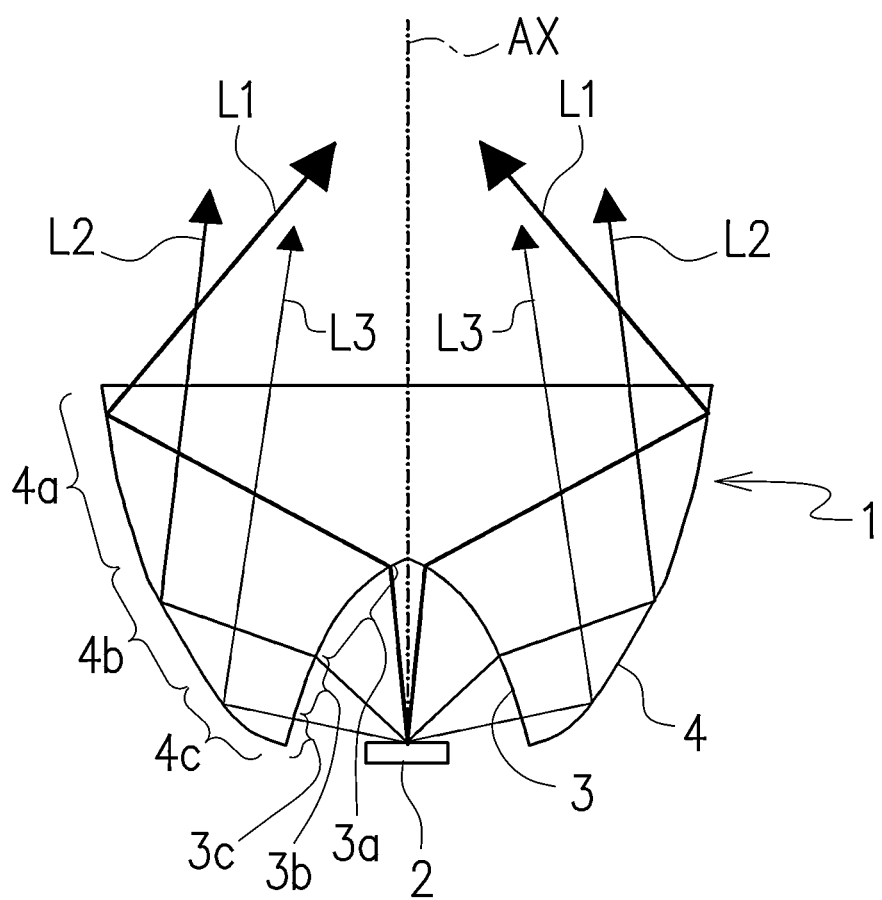
FIG. 6 is an explanatory view illustrating a TIR lens before being formed into a Fresnel lens.

In this embodiment, the Fresnel lens 14 includes a first Fresnel lens 14a and a second Fresnel lens 14b, the first Fresnel lens 14b including annular prisms that are divided from a convex lens 6 as illustrated in FIG. 5, and the second Fresnel lens 14b including annular prisms that are divided from a TIR lens 1 as illustrated in FIG. 6. The first Fresnel lens 14a has the plurality of annular prisms around a convex lens 14c disposed on the center axis AX of the light-incident side 10a. The second Fresnel lens 14b has the plurality of annular prisms that are arranged to be centered around the center axis AX, and is arranged around a periphery of the first Fresnel lens 14a.

As illustrated in FIG. 5, the first Fresnel lens 14a is obtained by dividing a light-incident surface 6a of the convex lens 6 disposed at a position facing the light source 2 into a plurality of concentric segmented areas a to f centered around the optical axis AX of the light source 2, and using these segmented portions as a plurality of annular prisms a' to f' different in angle of refraction from each other to be formed into a Fresnel lens. Light emitted from the light-emission surface 2a of the light source 2 comes incident on the annular prisms a' to f'. The incident light is then refracted upward and directly goes out from the light-exit side 10b.

Figure 7:
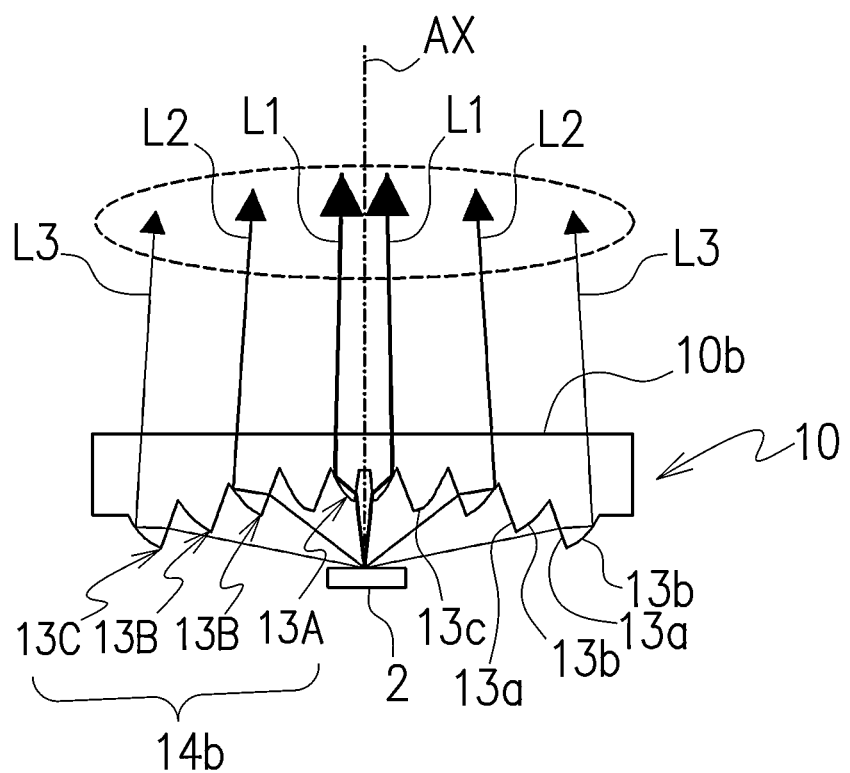
FIG. 7 is an explanatory view illustrating a Fresnel lens into which a TIR lens is formed and used as a second Fresnel lens.

As illustrated in FIG. 6, the second Fresnel lens 14b is obtained by dividing a light-incident surface of the TIR lens 1 into a plurality of concentric segmented areas 3a to 3c and 4a to 4c centered around the optical axis of the light source 2, and using these segmented portions as a plurality of annular prisms 13A to 13C different in angle of refraction from each other as illustrated in FIG. 7 to be formed into a Fresnel lens.

The second Fresnel lens 14b will be described further in detail. The region of the second Fresnel lens 14b functions as a TIR lens. More specifically, the TIR lens 1 as illustrated in FIG. 6 includes a concave surface 3 which is arranged centering around an optical axis AX to receive the light from the light source 2 the TIR lens 1, and a convex surface 4 arranged around the concave surface 3 to totally reflect the light incident on the concave lens surface 3, and then directs toward a light-exit side positioned above the peripheral side surface. As illustrated in FIG. 7, the annular prisms 13A to 13C of the second Fresnel lens 14b include incident surfaces 13a of prisms corresponding to the areas 3a to 3c to be divided of the concave lens surface 3, and reflection surfaces of prism corresponding to the segmented areas 4a to 4c of the convex lens surface 4 to totally reflect the light after the light is incident on the segmented areas 3a to 3c.

In other words, as illustrated in FIGS. 6 and 7, through formation of the TIR lens into the Fresnel lens, the segmented area 3a on the inner side of the periphery of the central part of the concave lens surface 3 in the TIR lens 1 and the segmented area 4a which is on the peripheral side of the periphery of the peripheral part of the convex lens surface 4 that totally reflects the light incident on the segmented area 3a correspond to the incident surface 13a of the annular prism 13A at the periphery of the central part and the reflection surface 13b of the annular prism 13A in the lens member 10 of the present embodiment, respectively.

The segmented area 3b that is positioned closer to an outer side of the segmented area 3a at the concave lens surface 3 of the TIR lens 1 corresponds to the incident surface 13a of the annular prism 13B. The annular prism 13B is positioned in an intermediate part between the central part and the vicinity of the periphery of the lens member 10, according to an embodiment of the present invention. The segmented area 4b is positioned inward of the segmented area 4a of the convex lens surface 4 which is configured to totally reflects the light after the light is incident on the segmented area 3b and corresponds to the reflection surface 13b of the annular prism 13B in an intermediate part between the central part and the vicinity of the periphery in the lens member 10 according to the embodiment of the present invention.

Further, in the concave lens surface 3 of the TIR lens 1, the segmented area 3c that is positioned adjacent to the convex lens surface 4 corresponds to the incident surface 13a of the annular prism 13C, which is positioned around the periphery of the second Fresnel lens 14b. Also, the segmented area 4c to totally reflect light after the light being received at the segmented area 3c is positioned inword periphery of the convex lens surface 4 corresponds to the reflection surface 13b of the annular prism 13C.

Thus, in the second Fresnel lens 14b, an annular prism corresponding to the segmented area 4a positioned at a rather upper outer side of the convex lens surface 4 in the TIR lens 1 is more inwardly positioned (positioned closer to the center axis AX), while an annular prism corresponding to the segmented area 4c positioned at a rather lower outer side of the convex lens surface 4 of is more outwardly positioned (positioned more distant from the center axis AX in a direction vertical to the center axis AX). Therefore, each of the annular prisms 13A to 13C has a vertex angle, which is different in accordance with each position relative to the light source 2. Note that the vertex angle is an angle formed by the incident surface 13a and the reflection surface 13b, which are fraction surface 13c formed at the vertex.

While the reflection surface 13b of prism is formed from a planar surface, or a two-dimensional curved surface such as paraboloid surface, hyperboloid surface, and ellipsoid surface, the reflection surface 13b of prism is preferably formed from a planar surface in consideration of workability. The incident surface 13a of prism is also inclined with respect to the optical axis AX to face toward the light source 2. Moreover, while the incident surface 13a of prism is formed from a planar surface or a convex two-dimensional curved surface, it is preferably formed from a planar surface in consideration of workability. Note that, in the present embodiment, the light-exit side 10b, which is opposite to the light-incident side 10a having the Fresnel lens 14, includes a flat face.

The diffraction grating structure 15 disposed around the Fresnel lens 14 includes a plurality of concentric annular minute grooves 15a. The diffraction grating structure 15 diffracts the light from the light source 2 and directs the light to be exited from the light-exit side 10b disposed on the opposite side of the light-incident side 10a as diffracted light.

Figure 8:
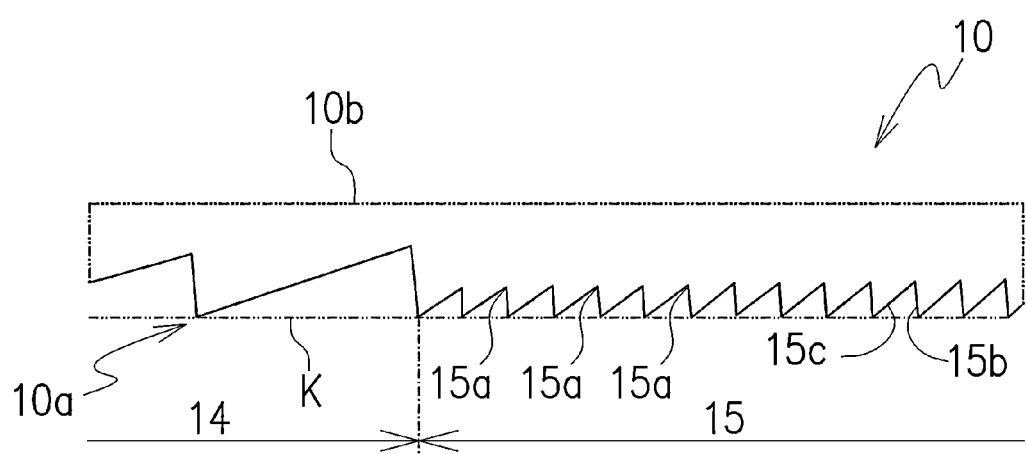
FIG. 8 is an enlarged explanatory view illustrating a diffraction grating structure of the lens member illustrated in FIG. 1.
Figure 10:
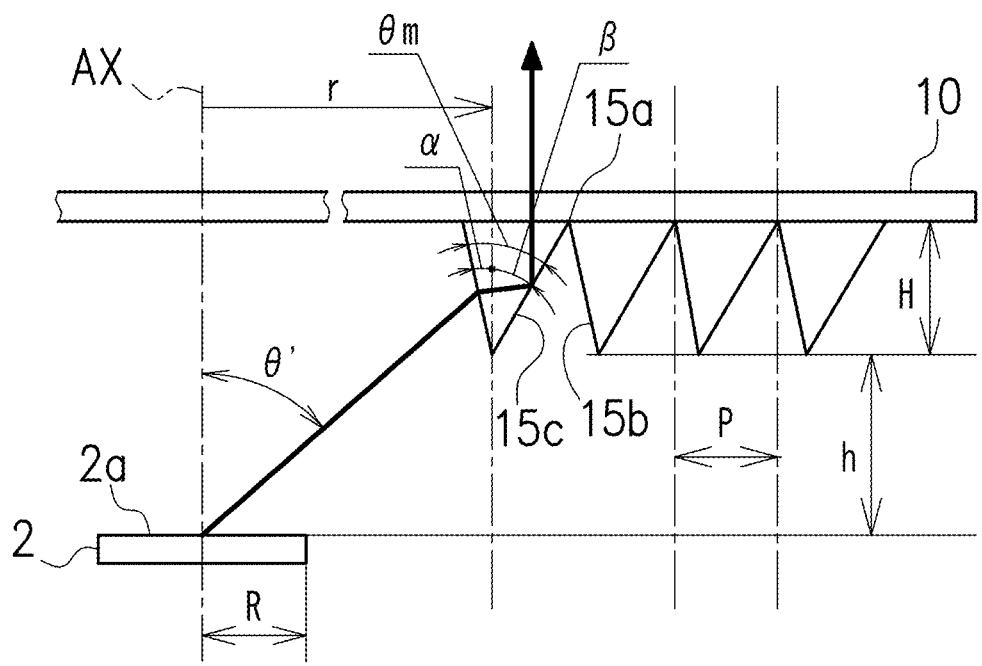
FIG. 10 is an explanatory view illustrating angles set for an outer slope and for an inner slope in an annular minute groove of the diffraction grating structure.

As illustrated in FIG. 1, the diffraction grating structure 15 includes plurality of concentric annular minute grooves 15a centered around the center axis AX of the light-incident side 10a. The concentric annular minute grooves 15a are arranged around a periphery of the Fresnel lens 14. Each of the annular minute grooves 15a has a generally triangular shape in cross-section as illustrated in FIG. 8. These annular minute grooves 15a are formed at a fine groove pitch of, for example, 10 µm or less, in order to acquire wave optical behavior, i.e., an effect of light interference, corresponding to wavelengths of incident light. As illustrated in FIG. 10, the groove pitch is equivalent to a width p between two reference lines passing respective centers of two adjacent annular minute grooves 15a. The groove pitch p is constant throughout the whole diffraction grating structure 15. A vertex angle of each sawtooth between the annular minute grooves 15a is 90° or smaller.

As illustrated in FIG. 8, top portions (top portions of the sawtooth portions) between the plurality of annular minute grooves 15a which constitute the diffraction grating structure 15, each top end of the annular prisms in the first Fresnel lens 14a, each top end of the annular prisms in the second Fresnel lens 14b are of uniform height in a same plane K. In this lens member 10, height positions of the respective top portions are uniformly set so that the respective top portions are disposed on the plane at the side of the light-incident side 10a which is parallel to the light-exit side 10b. More specifically, each top end of the plurality of annular prisms in the first Fresnel lens 14a, each top end of the plurality of annular prisms in the second Fresnel lens 14b, and the top end of the diffraction grating structure 15 arranged around a periphery of the Fresnel lens 14 are of uniform height. Note that, in the present embodiment, the convex lens 14c disposed on the center axis AX also has its top portion positioned on the same plane K as the top portion of each of the annular prisms, and therefore the height positions of these are set uniform. More specifically, the first Fresnel lens 14a further includes the convex lens 14c on the center axis AX, and the diffraction grating structure 15 includes the plurality of annular minute grooves 15a. In this configuration, the top portion of the convex lens 14c, and each top end of the plurality of annular prisms in the first Fresnel lens 14a, each top end of the plurality of annular prisms in the second Fresnel lens 14b, and the top ends between the annular minute grooves 15a included in the diffraction grating structure 15 are of uniform height.

Thus, on the light-incident side 10a of the lens member 10 according to the embodiment of the present invention, the Fresnel lens 14 includes the first Fresnel lens 14a and the second Fresnel lens 14b that include the annular prisms arranged to be centered around the center axis AX. The diffraction grating structure 15 including the plurality of concentric annular minute grooves 15a that are arranged to be centered around the center axis AX is arranged around a periphery of the Fresnel lens 14. Note that in an example, the lens member 10 may be made of a light transmissive material such as acrylic resin integrally molded into a disc shape.

Figure 4:
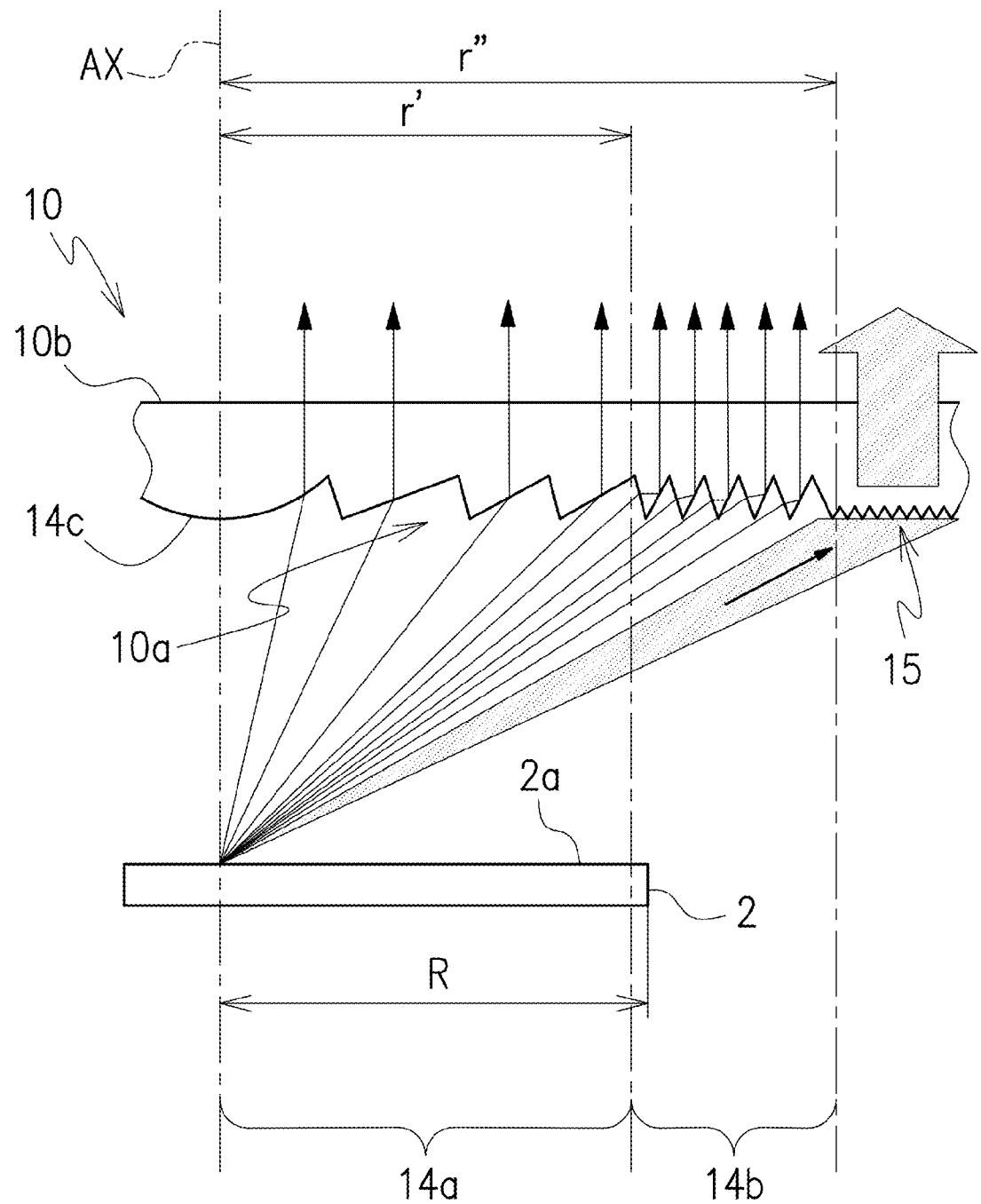
FIG. 4 is an enlarged cross sectional view illustrating I portion of FIG. 1.

The light source 2 includes a plurality of LED elements arranged in a plane. For example, a light source including a plurality of LED elements that are arranged in a circular region on a circuit board may be employed. Therefore, the light source 2 does not appear to be a point light source but a surface light source having a light-emission surface with a relatively large area. As illustrated in FIGS. 1 and 4, the light source 2 has a light-emission surface 2a facing the Fresnel lens 14. The radius R of the light-emission surface 2a is set larger than a radial distance r' of the first Fresnel lens 14a in the Fresnel lens 14 and is set smaller than a radial distance r" of the second Fresnel lens 14b. That is, a distance to the inner diameter of the diffraction grating structure 15 is set larger than the radius R of the light-emission surface of the light source. Note that not only an LED having a plurality of LED elements arranged in a plane but also an LED having one LED element may be employed as the light source 2.

When the first and second Fresnel lenses 14a and 14b and the diffraction grating structure 15, which constitute the light-incident side 10a of the lens member 10, are configured with the following ratios, a well-balanced lens with high light-collecting performance can be achieved. For example, in FIGS. 1 and 4, assuming that R is defined as a radius of the light-emission surface 2a of the light source 2, r is defined as a radial distance of the light-incident side 10a of the lens member 10 from the center axis AX of the light-incident side, h is defined as a distance from the light-emission surface 2a of the light source 2 to the light-incident side 10a of the lens member 10, and $\Delta\theta$ is defined as a range of an incident angle of light which is from the light-emission surface 2a of the light source 2 incident on the light-incident side 10a of the lens member 10. In this case, the diffraction grating structure 15 is preferably configured to satisfy the range of $\Delta\theta = \arctan\{(r+R)/h\} - \arctan\{(r-R)/h\} \leq 15°$. Note that $\Delta\theta$ is an angle difference between an incident angle $\theta n$ of light incident on from a nearest position of the light-emission surface 2a and an incident angle $\theta f$ light incident on from a most distant position of the light-emission surface 2a.

The radial distance r' as to the first Fresnel lens 14a is preferably in the range of r'<R and, and the radial distance r" as to the second Fresnel lens 14b is preferably in the range of r"≥R and $\Delta\theta > 15°$.

A description will next be given of incidence and emission of light from the light source 2 in the lens member 10 of the present embodiment.

First, a description will be given of incidence and emission of light in the Fresnel lens 14 disposed in the central part of the light-incident side 10a of the lens member 10. As illustrated in FIG. 4, in the first Fresnel lens 14a, light emitted from the light source 2 is refracted by the light-incident side 10a of the lens member 10, and the refracted light travels upward and is emitted as parallel light from the light-exit side 10b of the lens member 10. More specifically, in the first Fresnel lens 14a, the light refracted by the incident surfaces of the annular prisms travels upward without going to the reflection surfaces of the annular prisms, and is directly emitted as parallel light from the light-exit side 10b of the lens member 10.

A description will now be given of incidence and emission of light in the second Fresnel lens 14b. For example, in the TIR lens 1 illustrated in FIG. 6, light L1 with highest light intensity which is emitted from the light source 2 toward the central part right above the light source 2 is incident on the central part (segmented area 3a) of the light-incident surface that is the concave lens surface 3 on the inner side. Then, the light L1 is totally reflected by the light reflection surface (segmented area 4a) in the vicinity of the outer edge of the convex lens surface 4, and is emitted from the vicinity of the peripheral part of the light-emission surface of the TIR lens which is positioned above the light source. Contrary to this, in the second Fresnel lens 14b which is formed into a Fresnel lens from the TIR lens 1 as illustrates in FIG. 7, the light L1 with highest light intensity which is emitted from the light source 2 toward the central part right above the light source 2 is incident on the incident surface 13a of the annular prism 13A on an inner central part. Then, the light L1 is totally reflected by the reflection surface 13b of the annular prism 13A and is emitted from the central part of the light-exit side 10b of the lens member 10.

Also in the TIR lens 1, light L2 at the periphery of the central part, emitted from the light source 2 in a direction slightly oblique with respect to the optical axis AX with relatively high light intensity, is incident on the light-incident surface (segmented area 3b) that is the concave lens surface 3 on the inner side. Then, the light L2 is totally reflected by the light reflection surface (segmented area 4b) on the outer side of the convex lens surface 4, and is emitted from the intermediate part between the central part and the outer edge of the light-emission surface. Contrary to this, in the lens member 10 of the present embodiment, the light L2 at the periphery of the central part, emitted from the light source 2 in a direction slightly oblique with respect to the optical axis AX with relatively high light intensity, is incident on the incident surface 13a of the annular prism 13B on the inner side as illustrated in FIG. 7. Then, the light L2 is totally reflected by the reflection surface 13b of the annular prism 13B, and is emitted from the intermediate part between the central part and the outer edge in a region of the light-exit side 10b which faces the second Fresnel lens 14b.

Further in the TIR lens 1, light L3 emitted from the light source 2 in a direction highly oblique with respect to the optical axis AX with relatively low light intensity is incident on the light-incident surface (segmented area 3c) that is the concave lens surface 3 on the inner side. Then, the light L3 is totally reflected by the light reflection surface (segmented area 4c) on the inner side of the convex lens surface 4, and is emitted from around the central part of the light-emission surface. Contrary to this, in the lens member 10 of the present embodiment, the light L3 emitted from the light source 2 in the direction highly oblique with respect to the optical axis AX with relatively low light intensity is incident on the incident surface 13a of the annular prism 13C on the outer side. Then the light L3 is totally reflected by the reflection surface 13b of the annular prism 13C, and is emitted from the vicinity of the outer edge of a region of the light-exit side 10b which faces the second Fresnel lens 14b.

In short, as illustrated in FIG. 4, the light emitted from the light source 2 is refracted by the light-incident side 10a in the second Fresnel lens 14b. The refracted light is then totally reflected by the reflection surface and travels upward before being emitted as parallel light from the light-exit side 10b of the lens member 10.

As described in the foregoing, in the annular prisms which constitute the Fresnel lens 14, the light incident from the light source 2 on the light-incident side 10a is refracted only by the incident surface of each of the annular prisms, or is refracted by both the incident surface and the reflection surface of each of the annular prisms to be emitted from the light-exit side 10b of the lens member 10 as parallel light.

A description will now be given of a design of the diffraction grating structure 15.

Figure 9:
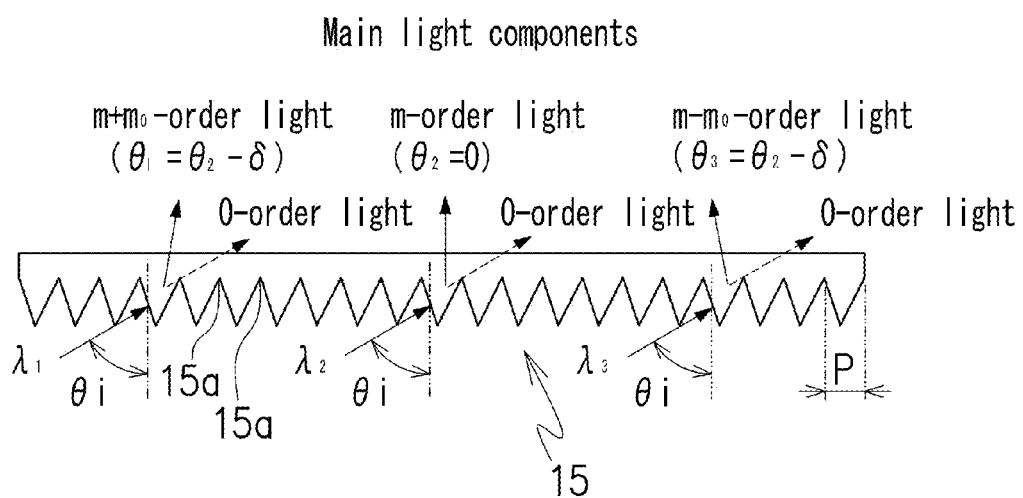
FIG. 9 is a view for use in explaining the principle when designing the diffraction grating structure of the lens member according to the first embodiment.

As illustrated in FIG. 9, in designing the configuration of the diffraction grating structure 15, it is assumed that the light from the light source 2 is white light, and designing is made by using three types of typical light components included in the white light: a blue light component (wavelength $\lambda_1$: 460 nm, for example); a green light component (wavelength $\lambda_2$: 555 nm, for example); and a red light component (wavelength $\lambda_3$: 630 nm, for example).

More specifically, assuming a case in that p is defined as a groove pitch of the annular minute groove 15a, $\theta_i$ is defined as an incident angle of light with respect to a vertical imaginary line parallel to the center axis of the light-incident surface, $\theta_1$ (blue light), $\theta_2$ (green light) and $\theta_3$ (red light) represent emission angels of the three types of light (diffracted light) with respect to the vertical imaginary line parallel to the center axis, and m is defined as an order of diffracted light. In this case, following relational expressions are satisfied in the diffraction grating structure 15:

$$p(\sin\theta_i + \sin\theta_2) = m\lambda_2 \qquad (1)$$

$$p(\sin\theta_i + \sin\theta_1) = (m+m_0)\lambda_1 \qquad (2)$$

$$p(\sin\theta_i + \sin\theta_3) = (m-m_0)\lambda_3 \qquad (3).$$

Here, if $|\theta_2-\theta_1|=\delta_1$ and $|\theta_2-\theta_3|=\delta_3$ are introduced to suppress separation of white light, then $0 \leq \Delta\delta_1 \leq 5$ and $0 \leq \delta_3 \leq 5$ are needed.

However, in order to simplify calculation, the assumption of $\delta_1=\delta_3$ is used. In short, the necessary condition is as shown below:

$$0 \leq \delta \leq 5 \qquad (4).$$

The following formulas (5) and (6) are derived from the above-stated formulas (2), (3) and (4).

$$m\{\lambda_2(1-\sin\delta/\sin\theta_i)-\lambda_1\} \leq m_0\lambda_1 \leq m\{\lambda_2(1+\sin\delta/\sin\theta_i)-\lambda_1\} \qquad (5)$$

$$m\{\lambda_3-\lambda_2(1+\sin\delta/\sin\theta_i)\} \leq m_0\lambda_1 \leq m\{\lambda_3-\lambda_2(1-\sin\delta/\sin\theta_i)\} \qquad (6)$$

In this case, if the formulas (1), (5) and (6) are satisfied, $\lambda_1$, $\lambda_2$, and $\lambda_3$ are to be diffracted in the direction of $\theta_2 \pm \delta$.

By adopting such design setting, it becomes possible to provide the diffraction grating structure 15 which can diffract and emit three types of light components, which constitute the white light including a short wavelength component, a middle wavelength component and a long wavelength component, in substantially the same direction in the angle difference range as narrow as $\pm\delta$. As a result, the entire white light can be emitted in substantially the same directions.

Figure 11:
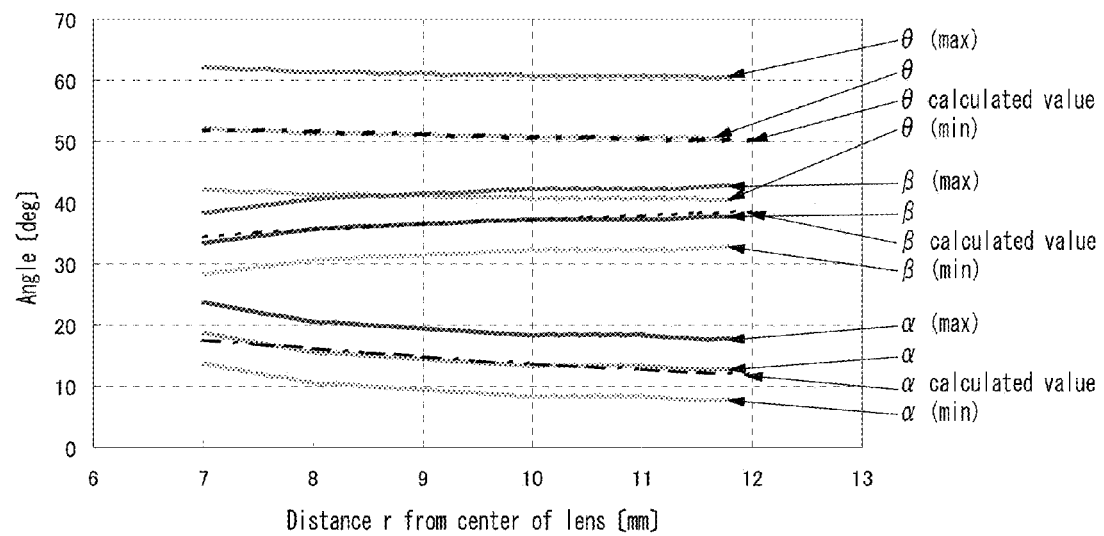
FIG. 11 is a graph illustrating angles of the outer slope and the inner slope in the annular minute groove of the diffraction grating structure with respect to distance from the center of lens in the lens member according to the first embodiment.

Moreover, as illustrated in FIG. 10, an angle $\alpha$ of an outer slope 15b and an angle $\beta$ of an inner slope 15c that constitute each of the annular minute grooves 15a are set to change in accordance with a distance r from the center (lens center) of the light-incident surface so that the diffracted light beams emitted from the respective annular minute grooves 15a have the same emission direction. More specifically, as illustrated in FIG. 10, a vertex angle $\theta$m of each sawtooth portion between the annular minute grooves 15a, and the angle $\alpha$ of the outer slope 15b and the angle $\beta$ of the inner slope 15c that constitutes the vertex angle $\theta$m are made to slightly change in accordance with the distance r from the lens center on the basis of the optical design, as illustrated in FIG. 11, for example. In short, since the vertex angle $\theta$m, the angle $\alpha$ of the outer slope 15b, and the angle $\beta$ of the inner slope 15c change, the depth H of each of the annular minute grooves 15a also slightly changes in accordance with the distance r.

In this optical design simulation, a diameter of the light-emission surface of the light source 2 is set to 8.5 mm, an inner diameter of the diffraction grating structure 15 is set to 7 mm, an outer diameter of the diffraction grating structure 15 is set to 12 mm, and a distance h between the light-emission surface 2a of the light source 2 and the lens member 10 is set to 3.0 mm. In consideration of optical design precision of the vertex angle $\theta$m of the sawtooth portion, the angle $\alpha$ of the outer slope 15b and the angle $\beta$ of the inner slope 15c, there are also illustrated for the vertex angle $\theta$m, the angle $\alpha$ and the angle $\beta$ in the graph of FIG. 11, a vertex angle $\theta$m (min), an angle $\alpha$ (min) and an angle $\beta$ (min) which are respectively −5.0 degrees, and a vertex angle $\theta$m (max), an angle $\alpha$ (max) and an angle $\beta$ (max) which are +5.0 degrees as a reference.

The angle $\alpha$ of the outer slope 15b and the angle $\beta$ of the inner slope 15c may also be calculated by the following calculation formulas. It is preferable to set these angles $\alpha$ and $\beta$ so that the light emission direction in the diffraction grating structure 15 is aligned with the light emission direction in geometrical optics. The angles are preferably in the range that satisfies the following formulas (7), (8) and (9).

$$\tan\alpha = P/H - \tan\beta \qquad (7)$$

$$\beta = 45 - \{(\arcsin\{\sin(90-\theta'-\alpha)/n\} + \alpha)\}/2 \qquad (8)$$

$$\arctan\{(r-R)/h\} \leq \theta' \leq \arctan\{(r+R)/h\} \qquad (9)$$

In the above-described formulas, R is defined as a radius of the light-emission surface 2a of the light source 2, r is defined as a radial distance of the light-incident side 10a of the lens member 10 from the center axis AX of the light-incident surface, h is defined as a distance from the light-emission surface 2a of the light source 2 to the light-incident side 10a of the lens member 10, $\theta'$ is defined as an incident angle of light which is from the light-emission surface 2a of the light source 2 and incident on the light-incident side 10a of the lens member 10 with respect to the center axis AX, p is defined as a groove pitch of the annular minute grooves 15a in the diffraction grating structure, H is defined as a depth of the annular minute groove 15a, and n is defined as a refractivity of the lens member 10.

The angle $\alpha$ of the outer slope 15b, the angle $\beta$ of the inner slope 15c, and the vertex angle $\theta$m were calculated with use of the formulas (7), (8) and (9), and respective calculated values were plotted with dotted lines as in FIG. 11. The result indicates that the calculated values generally matched with central values of the simulation. This proves that the above calculation formulas are adequate.

Figure 12:
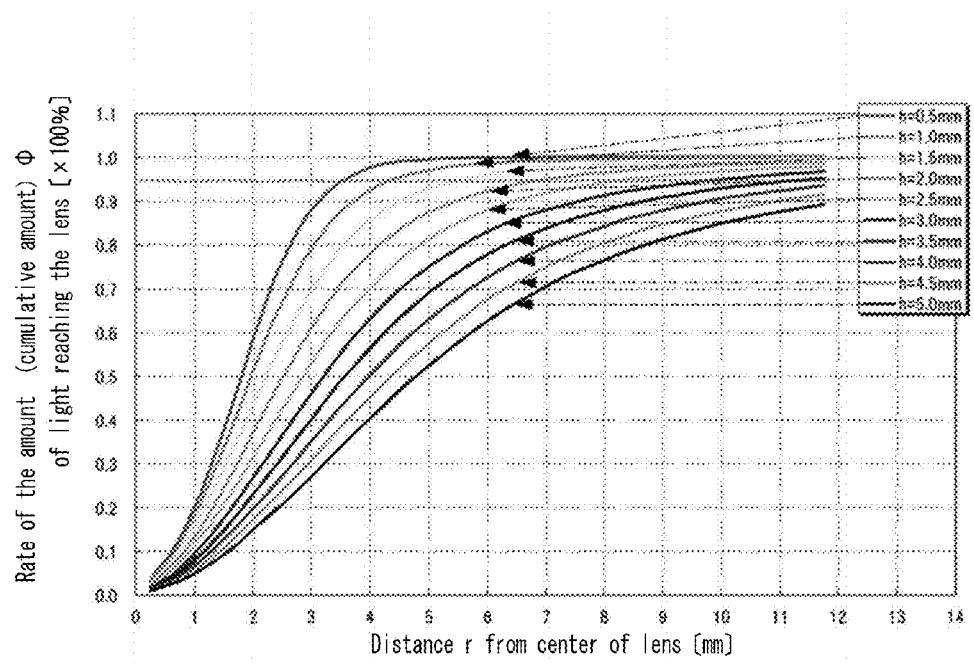
FIG. 12 is a graph illustrating a rate of the amount (cumulative amount) of light reaching the lens with respect to distance from the lens center in the lens member according to the first embodiment.

In designing the diffraction grating structure 15, a rate (cumulative amount) of the amount of light reaching the lens with respect to the distance r from the lens center changes in accordance with the distance r from the lens center as illustrated in FIG. 12. The rate also changes as the distance h between the lens member 10 and the light-emission surface 2a of the light source 2 changes. For example, if the rate (cumulative amount) of the amount of reaching light is set to 95% or more, it is necessary to set the distance h between the lens member 10 and the light-emission surface 2a of the light source 2 to 3.0 mm or less based on the simulation result.

Figure 13:
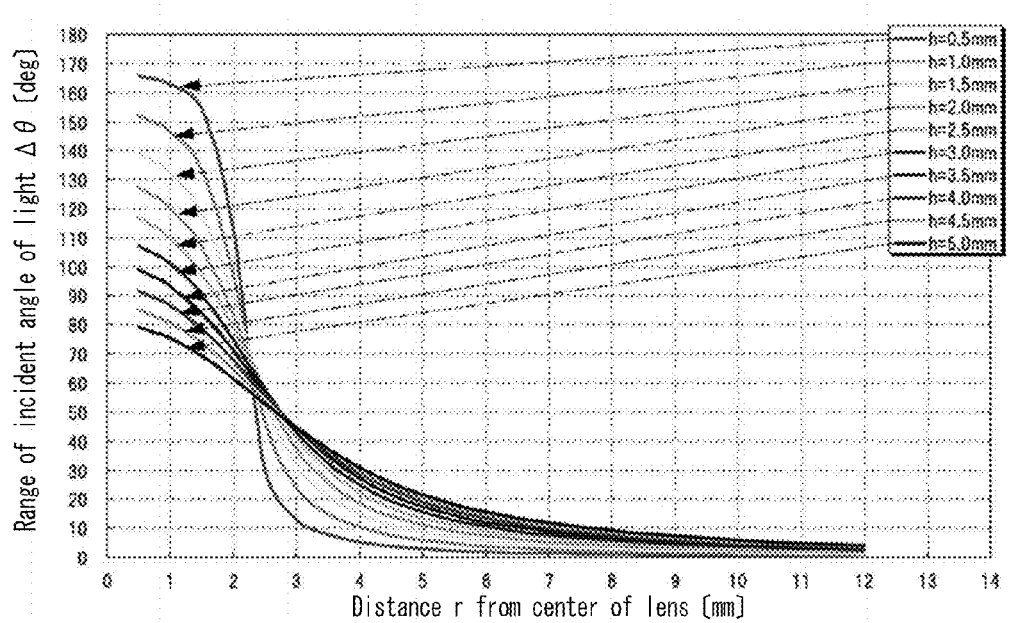
FIG. 13 is a graph illustrating a range $\Delta\theta$ of incident angle (an angle range based on difference between an angle of light incident on a nearest position of the light-incident side and an angle of light incident on a most distant position of the light-incident side) with respect to the distance from the center of lens in the lens member according to the first embodiment.

When an incident angle range $\Delta\theta$ (an angle difference between an angle $\theta$n of light incident on a nearest position of the light-emission surface and an angle $\theta$f light incident on a most distant position of the light-emission surface) with respect to the distance r from the lens center is determined by simulation, characteristics such as those illustrated in FIG. 13 are obtained. As is clear from the simulation result, $\Delta\theta$ is larger when the distance r from the lens center is up to about 7 mm, so that refraction by the Fresnel lens 14 is effective, whereas Δθ is smaller when the distance r is 7 mm or more, so that diffraction by the diffraction grating structure 15 is effective. For example, when the distance h between the lens member 10 and the light-emission surface of the light source 2 is set to 3.0 mm, the incident angle range Δθ is 15° or less if the distance r from the lens center is 7 mm or more.

Figure 14:
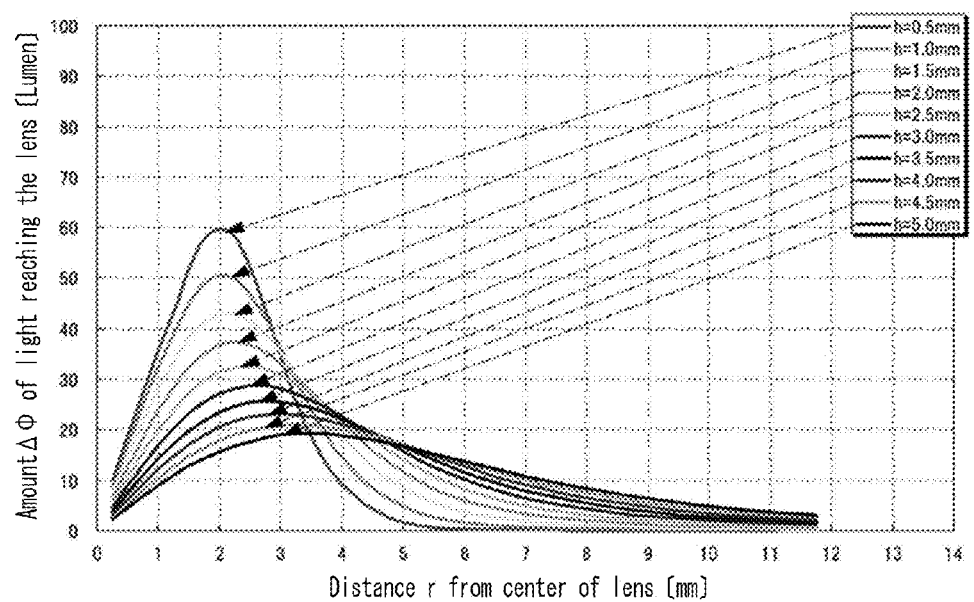
FIG. 14 is a graph illustrating the amount of light reaching the lens with respect to the distance from the center of lens in the lens member according to the first embodiment.

Further, if the amount of light reaching the lens with respect to the distance r from the lens center is determined by simulation, characteristics such as those illustrated in FIG. 14 are obtained. The simulation result indicates that the amount of reaching light is large when the distance r from the lens center is up to about 7 mm, and therefore refraction by the Fresnel lens 14 is effective.

The lens in the lens member 10 of the present embodiment is thicker as the radius of the Fresnel lens 14 is larger. Accordingly, in consideration of these simulation results, it is important for reduction in thickness and for light-collecting performance to make the region of the Fresnel lens 14 as small as possible and to decrease the inner diameter of the diffraction grating structure 15a.

Figure 15:
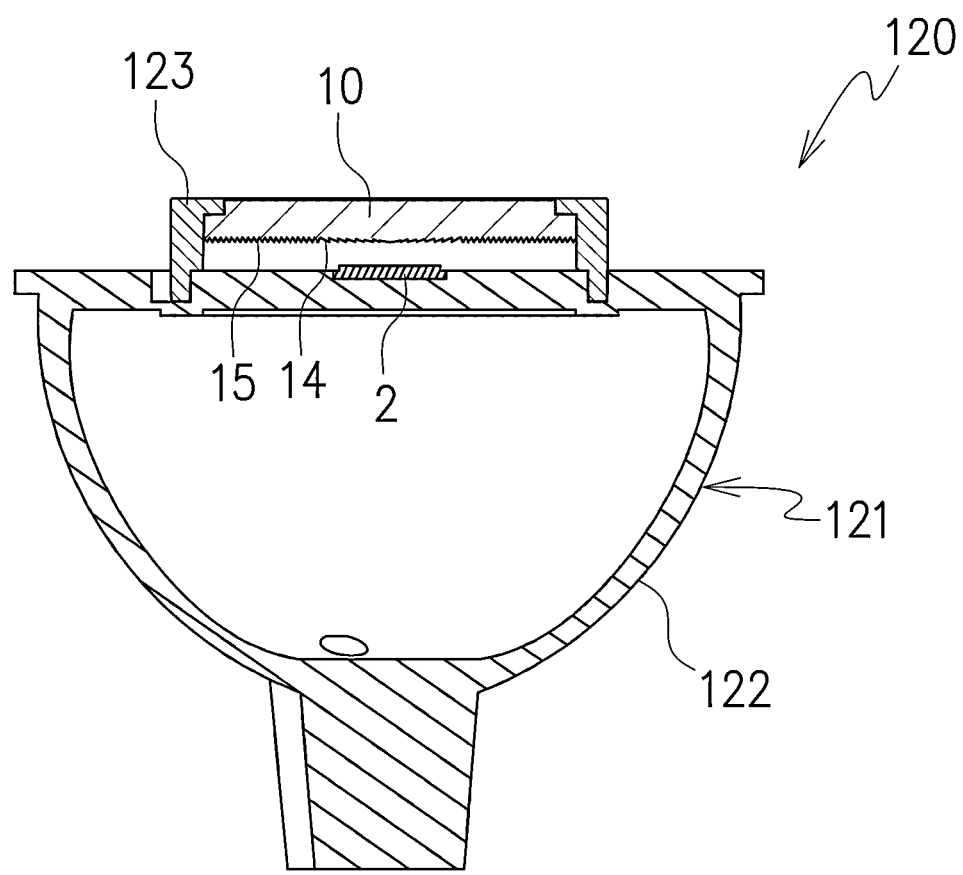
FIG. 15 is a cross sectional view of a light-emitting device using the lens member according to the first embodiment.
Figure 16:
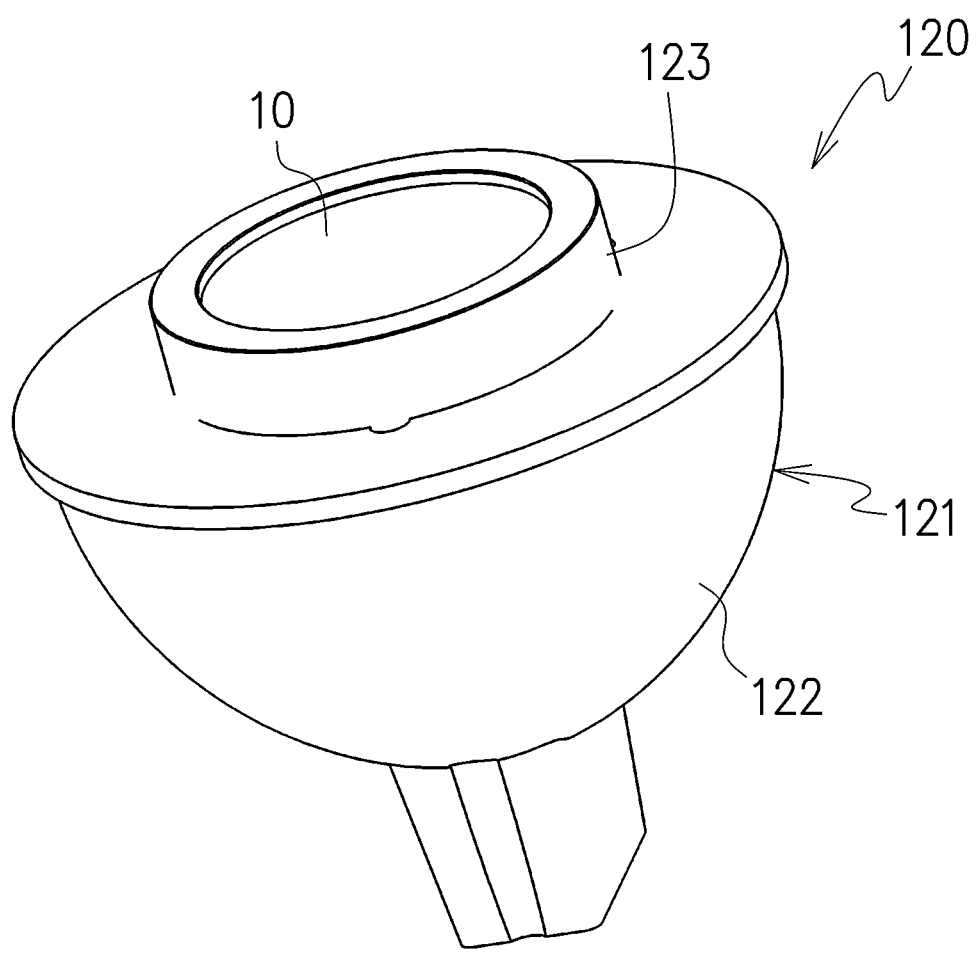
FIG. 16 is a perspective view illustrating external appearance of the light-emitting device illustrated in FIG. 15.

A description will now be given of a light-emitting device incorporating the above-described lens member of the present invention. The light-emitting device includes, as illustrated in FIGS. 15 and 16, an LED used as the light source 2, the lens member 10, and a casing 121 which houses these components. The casing 121 includes a hemispherical unit 122 having the light source 2 placed at the center of its upper surface portion, and a lens support frame portion 123 in a generally cylindrical shape placed on the upper surface portion of the hemispherical unit 122 to house the lens member 10. The lens support frame portion 123 is placed on the upper surface portion of the hemispherical unit 122 in a state where the lens member 10 faces the light source 2 with its center axis being aligned with a center axis of the hemispherical unit.

Figure 17:
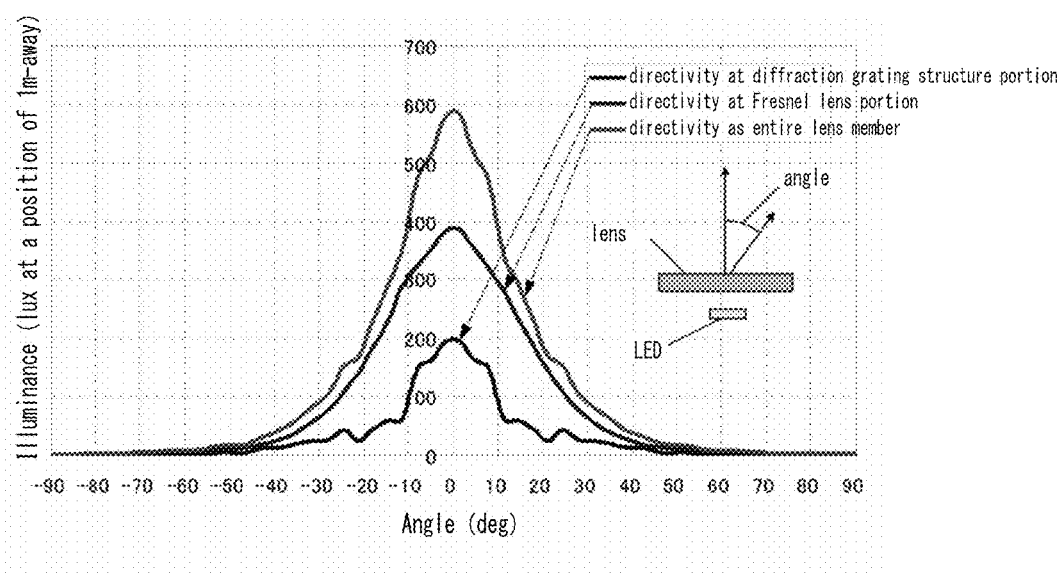
FIG. 17 is a graph illustrating respective directivities at the diffraction grating structure of the lens member, at the Fresnel lens portion, and as the entire lens member according to the first embodiment.

Next, the results of examining the directivity of the entire lens in the lens member 10, the directivity of only the Fresnel lens 14, and the directivity of only the diffraction grating structure 15 are illustrated in FIG. 17. As is clear from the results, in the case of using the diffraction grating structure 15 only, the directivity in the center axis direction is higher than that in the case of using the Fresnel lens 14 only. Accordingly, in the case of the using the entire lens with the Fresnel lens 14 being integrated with the diffraction grating structure 15, the directivity can be made higher than the directivity obtained from the Fresnel lens 14 only.

Thus, the lens member 10 of the present embodiment has the Fresnel lens 14 disposed around the center axis AX of the light-incident side 10a and the diffraction grating structure 15 annularly disposed around the Fresnel lens 14. The diffraction grating structure 15 is able to diffract the light from the light source 2 and to emit the light as diffracted light from the light-exit side 10b disposed on the opposite side of the light-incident side 10a. Accordingly, the light that has reached the central part of the light-incident side 10a from the light source 2 is refracted and collected by the Fresnel lens 14, and is emitted from the light-exit side 10b. The light that has reached the region around a periphery of the Fresnel lens 14 is diffracted and collected by the diffraction grating structure 15, and is emitted from the light-exit side 10b.

More specifically, when the Fresnel lens 14 is used up to the periphery of the light-incident side 10a of the lens member 10, a peripheral edge of the lens is thickened depending on the shape of the TIR lens 1, and the entire lens member may be thickened accordingly. Contrary to this, in the lens member 10 of the present embodiment, the periphery of the light-incident side 10a has the diffraction grating structure 15 which can be formed into a flat surface, so that the entire lens member can be further thinned. Moreover, when light is emitted not from a point light source but a surface light source having a light-emission surface with a relatively large area in particular, an angle difference between an incident angle $θ_n$ of light incident on a nearest position of the light-emission surface and an incident angle $θ_f$ of light incident on a most distant position of the light-emission surface becomes smaller in the outer peripheral part than in the central part of the light-incident side 10a, so that high light-collecting performance can be obtained by diffraction performed in the diffraction grating structure 15. Accordingly, with both the light-collecting performance of the Fresnel lens 14 on the central part of the lens and the diffraction grating structure 15 on the outer peripheral part, higher directivity can be achieved.

Since the diffraction grating structure 15 is provided on the outer peripheral side of the lens member 10 of the present embodiment, its curvature is smaller than that in a lens center portion, which makes it easy to manufacture a fine diffraction grating with high accuracy. Moreover, since it becomes possible to make the entire lens member still thinner, molding time for resin molding is shortened and manufacturing can be made at low costs so that sufficient mass productivity can be achieved. Further, the lens member 10 can be manufactured by methods other than resin molding such as injection molding. For example, the lens member 10 can be manufactured by imprinting on a glass substrate. The lens member 10 can also be manufactured with lens materials other than resins. For example, the Fresnel lens 14 and/or the diffraction grating structure 15 can be formed from a resin on an upper surface of a glass substrate.

Moreover, since the top portions of the annular prisms of the Fresnel lens 14 and the top portions between the plurality of annular minute grooves 15a which constitute the diffraction grating structure 15 are disposed on the same plane K, the region of the Fresnel lens 14 and the region of the diffraction grating structure 15 can be made into the same thickness. Accordingly, the entire lens can be made into a thin plate having a constant thickness.

Moreover, the diffraction grating structure 15 is made up of a plurality of annular minute grooves 15a having a generally triangular shape in cross-section, the annular minute grooves 15a being disposed concentrically with the center of the light-incident surface as its axis. Consequently, by setting the shape (a groove pitch, a depth, and an outer slope and an inner slope which constitute each annular minute groove) of the annular minute grooves 15a, a desired light-collecting performance can be obtained.

Further, the angles of the outer slope 15b and the inner slope 15c which constitute each of the annular minute grooves 15a are changed in accordance with the distance r from the center axis AX (lens center) of the light-incident side 10a, and the directions of the diffracted light emitted by each of the annular minute grooves 15a are set to be identical. As a result, higher light-collecting performance can be obtained compared with the case where the angles of the outer slope 15b and the inner slope 15c are constant.

Moreover, the Fresnel lens 14 is configured so that the annular prisms corresponding to the segmented areas 3a to 3c on the outer side of the convex lens surface 4 in the TIR lens 1 illustrated in FIG. 6 are disposed on more inner side, while the annular prisms corresponding to the segmented areas 3a to 3c on the inner side are disposed on more outer side. Accordingly, light of the central part with high light intensity is made incident on the incident surface 13a of prism of the annular prism 13A in the central part, and the light is totally reflected by the reflection surface 13b of the annular prism 13A. Therefore, the intense light which used to be emitted from the outer side in the conventional TIR lens and/or Fresnel lens can be emitted from the central part in the lens member 10 of the present embodiment.

As a consequence, in the lens member 10 of the present embodiment, a brightness distribution in which the luminous intensity gradually decreases from the center toward the outside and so the center is bright and the outer side is dark can be obtained. This makes it possible to suppress generation of ring-shaped lens flare and to improve its appearance.

Since the incident surface 13a and the reflection surface 13b of prism sequentially arranged with a ridgeline as each of the annular prisms, all parts of the light that are incident on the incident surface 13a of prism reach the reflection surface 13b of prism and are totally reflected by the same. As a result, the utilization efficiency can considerably be enhanced. Note that the Fresnel lens 14 is made up of the first Fresnel lens 14a and the second Fresnel lens 14b in the present embodiment, and the lens is divided into a larger number of segmented areas to be formed into a Fresnel lens. This makes it possible to achieve further enhancement of the light-collecting performance.

Further, since the inner diameter of the diffraction grating structure 15 is larger than the outer diameter of the light-emission surface 2a of the light source 2, the Fresnel lens 14 can receive intense light from the light-emission surface 2a which is disposed directly below the Fresnel lens 14 to face the Fresnel lens 14, and can effectively refract and collect the received light. At the same time, the diffraction grating structure 15 can receive light which comes from the light-emission surface 2a in an oblique direction to be incident on, and can also effectively diffract and collect the received light. Therefore, according to the light-emitting device 120 having the lens member 10, high front illuminance can be achieved. In addition, the thin lens member 10 makes it possible to provide LED optical products such as illuminations, projectors, flashes, and headlights and tail lamps of automobiles, which are high in utilization efficiency of light emitted from the LED as the light source 2 and which are thinner.

Figure 18:
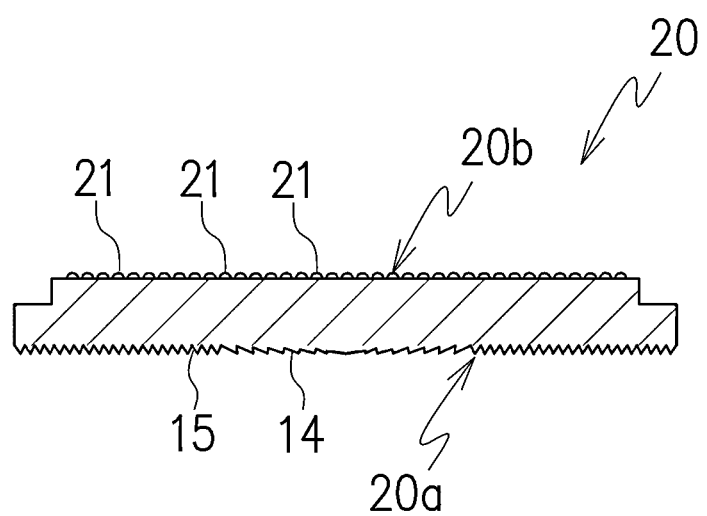
FIG. 18 is a cross sectional view of a lens member according to a second embodiment of the present invention.

Now, a lens member and a light-emitting device in a second embodiment according to the present invention will be described below with reference to FIG. 18. Note that, in the following description of the embodiment, component members identical to those in the above-described embodiment are designated by identical reference numerals to omit a description thereof.

The second embodiment is different from the first embodiment in the following points. In the first embodiment, the light-exit side 10b on the opposite side of the Fresnel lens 14 and the diffraction grating structure 15 is formed into a flat face. Contrary to this, in a lens member 20 of the second embodiment, as illustrated in FIG. 18, a large number of depressions and projections 21 are entirely disposed on a light-exit side 20b which is on the opposite side from a light-incident surface 20a having the same Fresnel lens 14 and diffraction grating portion 15 as the first embodiment provided thereon. The depressions and projections 21 controls at least one of diffusibility and directivity of light emitted from the light-exit side 20b. More specifically, in one example of the lens member 20 of the second embodiment, the depressions and projections 21 may be configured so that a plurality of elliptical projection portions having diffusibility are arrayed on the light-exit side 20b in order to diffuse light exited through. Note that the depressions and projections 21 may preferably include projection portions with an aspherical surface to efficiently refract the light. As the shape of the depressions and projections 21, other shapes such as a pyramid shape may also be employed.

Thus, since the depressions and projections 21 which control at least one of diffusibility and directivity of the light emitted from the light-exit side 20b are disposed on the lens member 20 of the second embodiment, it becomes easy to emit the light, which is collected to a maximum extent by the Fresnel lens 14 and the diffraction grating structure 15, with desired diffusibility and/or directivity that is achieved through refraction and diffusion performed by the depressions and projections 21 of the light-exit side 20b. In the lens member 20 of the second embodiment, the depressions and projections 21 of the light-exit side 20b can also reduce color unevenness as compared with the lens member 10 of the first embodiment.

Note that the depressions and projections 21 formed at a central part of the light-exit side 20b of the lens may have higher diffusibility than the depressions and projections 21 formed at an outer peripheral part. In that case, the diffusibility of the light-exit side 20b is higher at the central part than at the outer peripheral part. Accordingly, by diffusing a larger amount of light at the central part which tends to be affected by color unevenness of the light source 2, such a color unevenness may be effectively suppressed, while the lower diffusibility at the outer peripheral part may suppress deterioration illuminance in a frontal direction and/or may have a narrow directivity.

It should be understood that the present invention is not limited to each of the embodiments disclosed, but various modifications can be added without departing from the general meaning of the present invention.

For example, an optical sheet which controls at least one of diffusibility and directivity of light to be transmitted through may be placed at the light-exit side of the lens member. More specifically, the lens member is not necessarily provided with depression and projections directly at the light-exit side, but may be provided with an optical sheet, such as a diffusion sheet that uniformly scatters transmitting light, an anisotropic diffusion sheet or a prism sheet which scatters or refracts most of transmitting light in a specific direction, so that various kinds of light diffusibility and directivity may be set if needed. Note that the optical sheet may be made of a material which is small in refractive index difference from a material of the main body of the lens member.

Thus, by placing an optical sheet, which controls at least one of diffusibility and directivity, on the light-exit side of the lens member, it becomes easy to emit the light, which is collected to a maximum extent by the Fresnel lens and the diffraction grating structure disposed on the light-exit side of the lens member, with desired diffusibility and/or directivity that is achieved through refraction and diffusion performed by the optical sheet at the light-exit side.

REFERENCE SIGNS LIST

1 TIR lens
2 Light source
3 Concave lens surface
3a to 3c Areas to be divided of concave lens surface
4 Convex lens surface
4a to 4c Areas to be divided of convex lens surface
6 Convex lens 10 Lens member
10a Light-incident side
10b Light-exit side
13A to 13C Annular prisms
13a Incident surface of prism
13b Reflection surface of prism
13c Refraction surface of prism
14 Fresnel lens
14a First Fresnel lens
14b Second Fresnel lens
14c Convex lens
15 Diffraction grating structure
15a Annular grooves
15b Outer slope
15c Inner slope
21 Depressions and projections
20 Lens member
120 Light-emitting device
AX Center axis of light-incident side

The invention claimed is:

1. A light-emitting device comprising a lens member, the lens member comprising:
    a light-incident side;
    a light-exit side that is opposite to the light-incident side;
    a Fresnel lens arranged on the light-incident side to be centered around a center axis of the light-incident side; and
    a diffraction grating structure arranged around a periphery of the Fresnel lens and arranged to be centered around the center axis;
    a light source arranged to face the light-incident side of the lens member and including a light-emission surface whose center is aligned with the center axis of the lens member,
    wherein R is defined as a radius of the light-emission surface of the light source, r is defined as a radial distance of the light-incident side of the lens member from the center axis of the light-incident side, h is defined as a distance from the light-emission surface of the light source to the light-incident side of the lens member, and Δθ is defined as a range of incident angle of light from the light-emission surface of the light source incident on the light-incident side of the lens member, and
    the diffraction grating structure satisfies $\Delta\theta=\arctan\{(r+R)/h\}-\arctan\{(r-R)/h\}\leq 15°$.

2. The light-emitting device according to claim 1, wherein the Fresnel lens includes a first Fresnel lens and a second Fresnel lens, the first Fresnel lens arranged with the center axis of the light-incident side at a center and comprises annular prisms that are divided from a convex lens, and the second Fresnel lens arranged around the periphery of the first Fresnel lens with the center axis of the light-incident side at the center and comprises annular prisms that are divided from a total internal reflection (TIR) lens.

3. The light-emitting device according to claim 1, wherein the diffraction grating structure comprises annular minute grooves, each of the annular minute groves arranged with a constant groove pitch.

4. The light-emitting device according to claim 1, wherein an outer peripheral edge of the light-emission surface of the light source is positioned inside an inner diameter of the diffraction grating structure arranged centering around the center axis of the light-incident side.

5. The light-emitting device according to claim 2, wherein a range of incident angle of light to be received at the annular prisms included in the Fresnel lens is different from a range of incident angle of light to be received at the diffraction grating structure.

6. The light-emitting device according to claim 2, wherein each top end of the annular prisms in the first Fresnel lens, each top end of the annular prisms in the second Fresnel lens, and a top end of the diffraction grating structure arranged around the periphery of the Fresnel lens are of uniform height.

7. The light-emitting device according to claim 2, wherein the first Fresnel lens further comprises a convex lens positioned on the center axis, the diffraction grating structure comprises annular minute groves, and a top portion of the convex lens, each top end of the annular prisms in the first Fresnel lens, each top end of the annular prisms in the second Fresnel lens, and a top end positioned between the annular minute grooves that are included in the diffraction grating structure are of uniform height.

8. The light-emitting device according to claim 2, wherein R is defined as a radius of the light-emission surface of the light source, and r is defined as a radial distance of the light-incident side of the lens member from the center axis of the light-incident side, and the first Fresnel lens satisfies r<R.

9. The light-emitting device according to claim 2, wherein R is defined as a radius of the light emission surface of the light source, r is defined as a radial distance of the light-incident side of the lens member from the center axis of the light-incident side, and Δθ is defined as a range of an incident angle of light which is from the light emission surface of the light source incident on the light-incident side of the lens member, and
the second Fresnel lens satisfies $r\geq R$ and $\Delta\theta>15°$.

10. The light-emitting device according to claim 3, wherein each of the annular minute grooves comprises an outer slope and an inner slope that is positioned closer to the center axis of the light-incident side than the outer slope, and an inclination angle of the outer slope and an inclination angle of the inner slope in each of the annular minute grooves change on the basis of distance from the center axis.

11. A light-emitting device comprising a lens member, the lens member comprising:
    a light-incident side;
    a light-exit side that is opposite to the light-incident side;
    a Fresnel lens arranged on the light-incident side to be centered around a center axis of the light-incident side; and
    a diffraction grating structure arranged around a periphery of the Fresnel lens and arranged to be centered around the center axis, and comprising annular minute grooves;
    a light source arranged to face the light-incident side of the lens member and including a light-emission surface whose center is aligned with the center axis of the lens member, wherein R is defined as a radius of the light-emission surface of the light source, r is defined as a radial distance of the light-incident side of the lens member from the center axis of the light-incident side, h is defined as a distance from the light-emission surface of the light source to the incident side of the lens member, θ' is defined as an angle formed between a line of light, which is from the light-emission surface of the light source and incident on the light-incident side of the lens member and the center axis, p is defined as a groove pitch of the annular minute grooves of the diffraction grating structure, H is defined as a groove depth of each of the annular minute grooves, and n is defined as a refractivity of the lens member, and each of the annular minute grooves in the diffraction grating structure has an inclination angle α of an outer slope and an inclination angle β of an inner slope, the inclination angles α and β satisfy following formulas:

$\tan \alpha = P/H - \tan \beta$ $\beta = 45 - \{(\arcsin\{\sin(90-\theta'-\alpha)/n\}+\alpha)\}/2$ $\arctan\{(r-R)/h\} \leq \theta' \leq \arctan\{(r+R)/h\}$.

12. The light-emitting device according to claim 11, wherein the Fresnel lens includes a first Fresnel lens and a second Fresnel lens, the first Fresnel lens arranged with the center axis of the light-incident side at a center and comprises annular prisms that are divided from a convex lens, and the second Fresnel lens arranged with the center axis of the light-incident side at the center, and comprises annular prisms that are divided from a total internal reflection (TIR) lens.

13. The light-emitting device according to claim 11, wherein the annular minute grooves of the diffraction grating structure are each arranged with a constant groove pitch.

14. The light-emitting device according to claim 11, wherein each of the annular minute grooves comprises an outer slope and an inner slope that is positioned closer to the center axis of the light-incident side than the outer slope, and an inclination angle of the outer slope and an inclination angle of the inner slope in each of the annular minute grooves change on the basis of distance from the center axis.

15. The light-emitting device according to claim 11, wherein an outer peripheral edge of the light-emission surface of the light source is positioned inside an inner diameter of the diffraction grating structure arranged centering around the center axis of the light-incident side.

16. The light-emitting device according to claim 12, wherein a range of incident angle of light to be received at the annular prisms included in the Fresnel lens is different from a range of incident angle of light to be received at the diffraction grating structure.

17. The light-emitting device according to claim 12, wherein each top end of the annular prisms in the first Fresnel lens, each top end of the annular prisms in the second Fresnel lens, and a top end of the diffraction grating structure arranged around the periphery of the Fresnel lens are of uniform height.

18. The light-emitting device according to claim 12, wherein the first Fresnel lens further comprises a convex lens positioned on the center axis, the diffraction grating structure comprises annular minute groves, and a top portion of the convex lens, each top end of the annular prisms in the first Fresnel lens, each top end of the annular prisms in the second Fresnel lens, and a top end positioned between the annular minute grooves that are included in the diffraction grating structure are of uniform height.

19. The light-emitting device according to claim 12, wherein R is defined as a radius of the light-emission surface of the light source, r is defined as a radial distance of the light-incident side of the lens member from the center axis of the light-incident side, and the first Fresnel lens satisfies r<R.

20. The light-emitting device according to claim 12, wherein R is defined as a radius of the light emission surface of the light source, r is defined as a radial distance of the light-incident side of the lens member from the center axis of the light-incident side, and Δθ is defined as a range of an incident angle of light which is from the light emission surface of the light source incident on the light-incident side of the lens member, and the second Fresnel lens satisfies $r \geq R$ and $\Delta\theta > 15°$.

* * * * *